United States Patent [19]

Wähling et al.

[11] Patent Number: 5,562,545
[45] Date of Patent: Oct. 8, 1996

[54] FLEXIBLE DISC, FOR A MOTOR VEHICLE DRIVE LINE

[75] Inventors: Werner Wähling, Kraiburg a. Inn; Georg Maierbacher, Kirchdorf b. Haag, both of Germany

[73] Assignee: SGF Suddeutsche Gelenkscheibenfabrik GmbH & Co. KG, Germany

[21] Appl. No.: 318,695

[22] PCT Filed: Feb. 11, 1994

[86] PCT No.: PCT/EP94/00396

§ 371 Date: Oct. 11, 1994

§ 102(e) Date: Oct. 11, 1994

[87] PCT Pub. No.: WO94/18467

PCT Pub. Date: Aug. 18, 1994

[30] Foreign Application Priority Data

Feb. 12, 1993 [DE] Germany ............ 43 04 274.0

[51] Int. Cl.⁶ ..................................... F16D 3/78
[52] U.S. Cl. ........................................... 464/93
[58] Field of Search .................. 464/69, 93, 92, 464/98, 99, 147

[56] References Cited

U.S. PATENT DOCUMENTS

| | | | |
|---|---|---|---|
| 3,032,807 | 5/1962 | Lanius | 16/97 |
| 4,118,952 | 10/1978 | Kobayashi | 464/69 |
| 4,182,139 | 1/1980 | Hornig et al. | 464/69 X |
| 4,188,802 | 2/1980 | Zeidler et al. | 464/93 X |
| 4,790,794 | 12/1988 | Takeda et al. | 464/93 |
| 5,033,988 | 7/1991 | McGuire et al. | 464/93 X |
| 5,163,876 | 11/1992 | Zilberman et al. | 464/93 X |
| 5,330,387 | 7/1994 | Miyakawa | 464/93 |

FOREIGN PATENT DOCUMENTS

| | | | |
|---|---|---|---|
| 837975 | 2/1939 | France . | |
| 2338411 | 12/1977 | France . | |
| 936548 | 11/1955 | Germany . | |
| 1021212 | 12/1957 | Germany . | |
| 1040854 | 10/1958 | Germany . | |
| 3942432 | 5/1991 | Germany . | |
| 211531 | 9/1987 | Japan | 464/93 |
| 321999 | 11/1929 | United Kingdom | 464/93 |

*Primary Examiner*—Daniel P. Stodola
*Assistant Examiner*—Eileen A. Dunn
*Attorney, Agent, or Firm*—Webb Ziesenheim Bruening Logsdon Orkin & Hanson, P.C.

[57] ABSTRACT

The axis of rotation of a disc body made of rubber-elastic material is surrounded by a plurality of mutually spaced bushings and loop sets consisting of string loops which are wrapped around the bushings in pairs. Supporting rings are slipped axially on the bushings to hold the loop sets together axially. The supporting rings each comprise an annular disc having teeth which project radially inwardly and anchor firmly on the corresponding bushing. In this manner the greatest possible space in axial direction of the bushings is saved for installation of the loop sets, at a given overall thickness of the flexible disc.

7 Claims, 2 Drawing Sheets

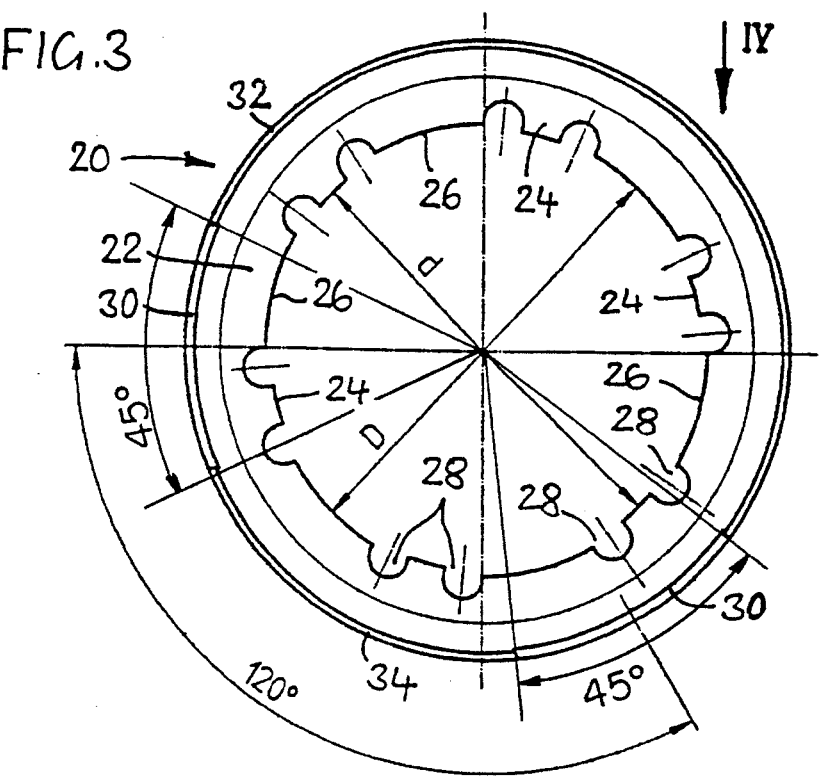
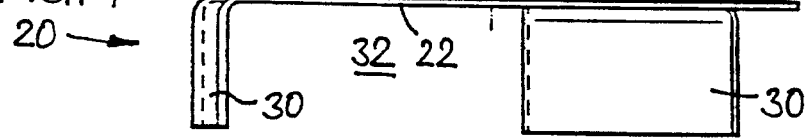
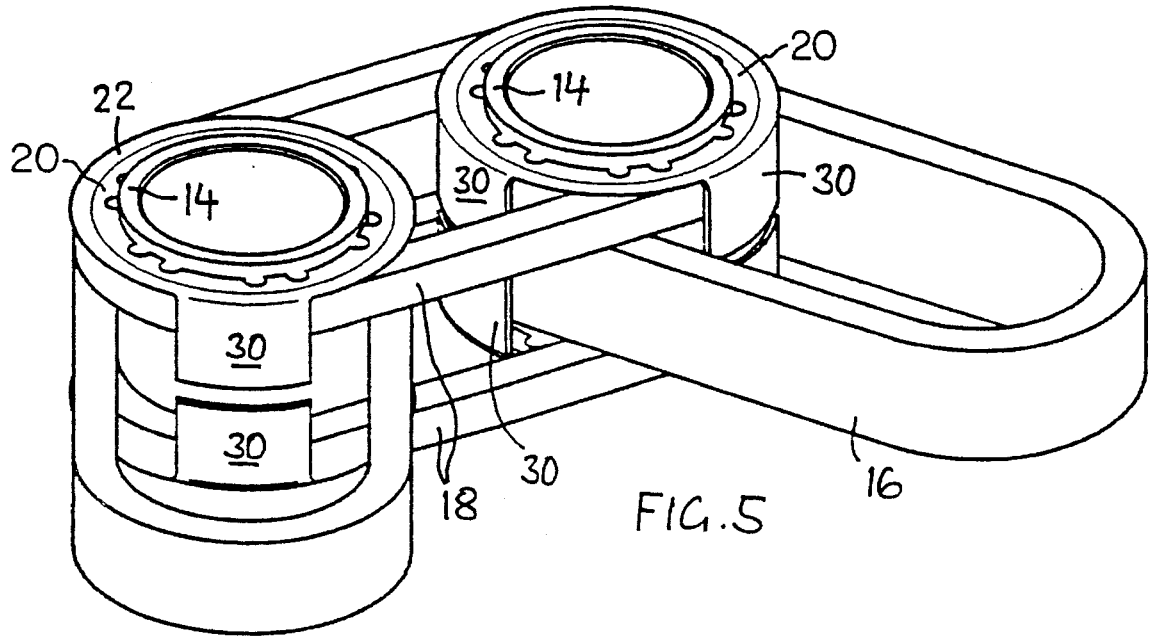

FLEXIBLE DISC, FOR A MOTOR VEHICLE DRIVE LINE

BACKGROUND OF THE INVENTION

1. Field of the Invention

The invention relates to a flexible disc especially for use in the drive line in motor vehicles.

2. Description of the Prior Art

Such a flexible disc is known, for instance, from DE 39 42 432 C1. There, the supporting ring profile is of L shape. The supporting rings each include a cylindrical portion which is press fitted on the corresponding bushing and has a flange extending substantially radially outwardly from the axially inner end thereof with respect to the bushing. The cylindrical portions must be relatively long in order to warrant a secure press fit and, therefore, each supporting ring takes up about one tenth of the total length of the corresponding bushing. Thus the space left to receive sets of loops between two supporting rings on a bushing is much shorter in axial direction than the bushing. Up to now, it was thought to be necessary to provide a thick layer of the rubber-elastic material, which forms the disc body, axially outside of the loop sets and flanges of the supporting rings. It was for this reason, among others, that the supporting rings were disposed with an axially inner flange on the bushings.

SUMMARY OF THE INVENTION

The invention is based on the finding that sufficient protection of the sets of loops and reliable integrity of a flexible disc of the kind specified above can be obtained also if the loop sets at the two face ends of the flexible disc are coated with but a rather thin layer of rubber-elastic material. The thickness of this layer, in principle, need not be greater than the thickness of the sheet metal used so far for making the supporting rings, i.e. for example from 0.4 to 0.6 mm.

Starting from this finding, it is the object of the invention to provide space as large as possible, in axial direction of the bushings, for installation of loop sets, at a given total thickness of a flexible disc of the kind described.

The object is met, in accordance with the invention, by a flexible disc comprising a disc body made of rubber-elastic material and having a central axis of rotation. A number of bushings are spaced from one another around the central axis of rotation. Loop sets consisting of string loops are wrapped around the bushings in pairs and supporting rings are slipped axially on the bushings to keep the loop sets together axially. Each supporting ring comprises an annular disc having teeth which project radially inwardly and anchor firmly on the corresponding bushing.

The supporting rings according to the invention preferably are stamped out of spring steel strip material having a thickness of from 0.4 to 1.0 mm, hardened, and annealed. It is sufficient to push a supporting ring of the type used according to the invention for approximately 1.5 to 2 mm in axial direction on a bushing in order to make sure that the teeth of the supporting ring become anchored reliably on the bushing.

In a preferred embodiment of the invention the annular disc is formed between the teeth with guide sections where the inner diameter of the disc is as great as or slightly greater than the outer diameter of the corresponding bushing. The guide sections center the annular disc and thus the entire supporting ring on the bushing without scratching the surface of the bushing. Any coating provided in conventional manner on the outer surface of the bushing thus might suffer damage only from the teeth, while its integrity otherwise is maintained.

It is further convenient if the annular disc has a recess at either side of each tooth, the width of the recesses being approximately the same as the width of the tooth. During manufacture of the disc body, rubber-elastic material can be injected through these recesses to displace any air trapped inside. In this way bridges are formed of the rubber-elastic material in the recesses and they firmly link a layer of this material, provided axially outside of the supporting rings, with the axially inner portion of the disc body, thus preventing separation of the outer layer, in operation, even if this layer is only very thin.

Supporting lobes extend from the radially outer edge of each annular disc approximately parallel to the corresponding bushing and straddle the respective loop sets in such a way that sets of loops wrapped around adjacent bushings cannot rub on each other, even at extreme loads which may act upon the flexible disc and even if their mutual spacing in the circumferential direction of the flexible disc is small to begin with in the unloaded state. The design according to the invention of the supporting rings thus makes it possible for the installation space available around each bushing to be exploited exceptionally well also in the radial direction.

BRIEF DESCRIPTION OF THE DRAWINGS

An embodiment of the invention will be described in greater detail below with reference to the accompanying diagrammatic drawings, in which:

FIG. 3 is an enlarged cutout of FIG. 1;

FIG. 4 is the view in the direction of arrow IV in FIG. 3; and

FIG. 5 is a perspective view of structural components of the flexible disc.

DESCRIPTION OF THE PREFERRED EMBODIMENT

Figure 1:
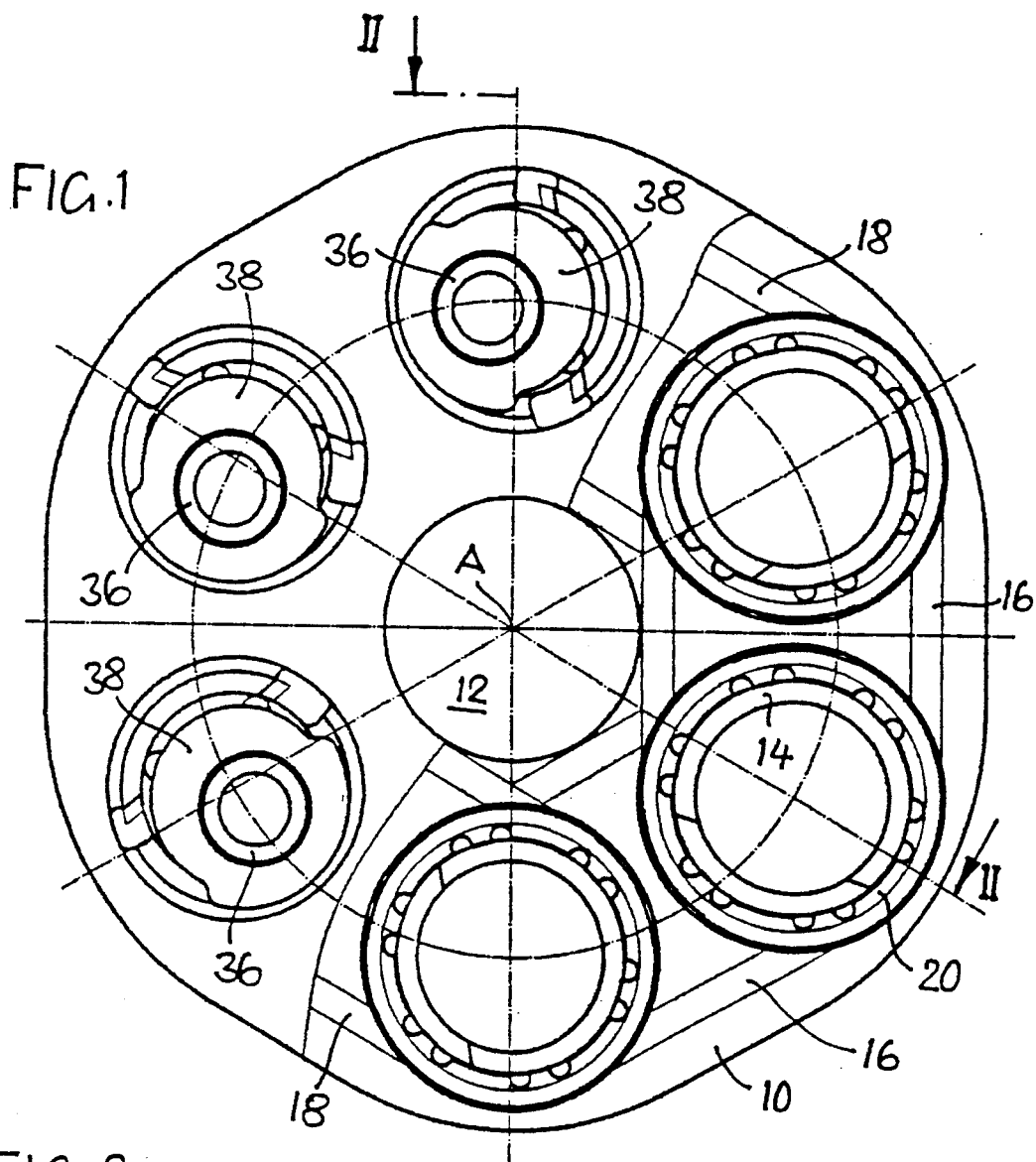
FIG. 1 is a top plan view of a flexible disc according to the invention, shown partly broken away.

The flexible disc shown in FIGS. 1–5 of the drawings is rotatable about an axis of rotation A and comprises a disc body 10 having a rounded hexagonal contour, being made of rubber, and including a central opening 12. Six cylindrical bushings 14 made of steel are embedded in the disc body 10 and wrapped in pairs by loop sets 16 and 18. The loop sets 16 and 18 on each of the bushings 14 are held together by a pair of supporting rings 20, each slipped onto an end of each of the bushings 14.

The supporting rings 20 are made of spring steel strip material, and their main component each is an annular disc 22 formed at the radially inner edge with teeth 24, guide sections 26, and recesses 28. In the embodiment disclosed herein, each annular disc 22 includes six teeth 24, six guide sections 26, and twelve recesses 28; one recess 28 each is located between each tooth 24 and each of the adjacent guide sections 26. The inner diameter D of the annular disc 22, as measured at the guide sections 26, is at least as great and up to 0.2 mm greater than the outer diameter of the corresponding bushing 14. In the embodiment shown, all the bushings 14 are identical and, therefore, also all the supporting rings 20 are alike.

The inner diameter d of each annular disc 22, measured at the teeth 24, is so selected that the teeth 24 will adopt a slightly oblique position when the supporting ring 22 is pressed onto a bushing 14 whereby they become anchored on the bushing by their sharp punched edges. The counterpressure from the loop sets 16 and 18 makes sure that radial forces are generated between the teeth 24 and the bushing 14 which are greater than the radial forces caused by elastic return forces of the teeth 24.

Two supporting lobes 30 project from the outer edge of the annular disc 22 of each supporting ring 20, extending in parallel with the corresponding bushing 14. They each present a section of a cylinder surface extending through 45°. The two supporting lobes 30 are offset by 120° with respect to each other so that two sections 32 and 34 remain which are free of supporting lobes and extend through 195° and 75°, respectively. If the total of six bushings illustrated in the drawings are replaced by eight such bushings, the angles vary accordingly. In any case, the supporting lobes 30 extend across one loop set 16 and 18, respectively, and into the adjacent loop set 18 and 16, respectively, in such a way that the sets of loops are guarded from contacting supporting rings 20 on adjacent bushings 14. The free sections 32 and 34 are wide enough to prevent the loop sets 16 and 18 from making contact with an edge of a supporting lobe 30, no matter what the circumstances.

As may be seen especially in FIG. 5, a supporting ring 20 is press fitted on each end of each bushing 14 such that the supporting lobes 30 of the two supporting rings 20 disposed on a bushing 14 face each other. The axial length of the supporting lobes 30 is dimensioned such that the supporting lobes facing each other in pairs will not come into mutual contact even under the strongest deformation possible which the flexible disc may suffer in operation. Yet the supporting rings 20 are pressed onto the bushings 14 with so much force that the loop sets 16 and 18 are kept closely together.

Figure 2:
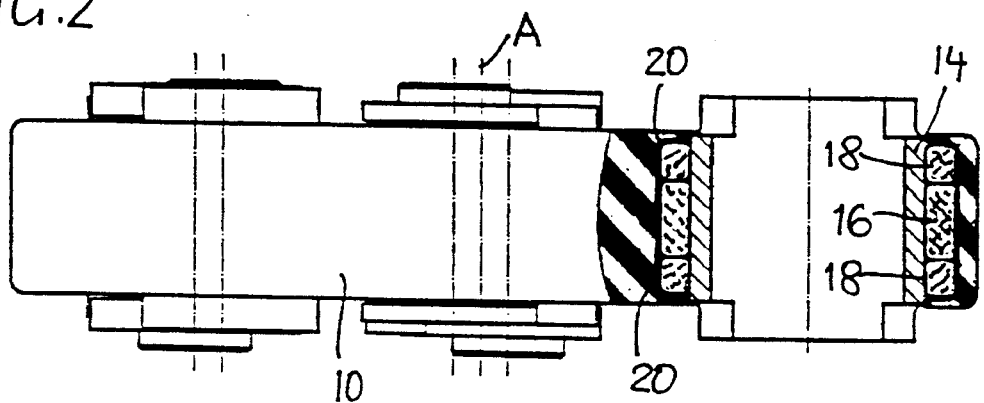
FIG. 2 is the side elevational view II—II of FIG. 1, shown partly in section.

As may be seen particularly in FIG. 3, the recesses 28 have approximately the same width as the teeth 24 so that the rubber which is used for making the disc body 10 and in which the bushings 14, the loop sets 16 and 18, as well as the supporting rings 20 become embedded can flow through the recesses 28 without any obstruction worth mentioning. FIG. 2 shows that the rubber of the disc body 10 also covers the axially outer end faces of the annular discs 22.

For the sake of completeness, the left part of FIG. 1, which is the part not broken away, illustrates inner bushings 36 likewise made of steel and inserted eccentrically into one of the bushings 14 each which are wrapped by the loop sets 16 and 18. Part of the space between each inner bushing 36 and the corresponding outer bushing 14 is filled in conventional manner by a rubber element 38. The inner bushings 36 are provided for the purpose of receiving a fastening bolt each. Such inner bushings 36, however, are not required in each case; especially with smaller flexible discs, fastening bolts are inserted directly through the bushings 14 which are wrapped by the loop sets 16 and 18.

Having described an embodiment of the invention, it is to be understood that it may be otherwise embodied within the scope of the appended claims.

What is claimed is:

1. A flexible disc, for use in the drive line of a motor vehicle, comprising a disc body made of rubber-elastic material and having a central axis of rotation, a plurality of bushings embedded in said disc body and spaced from one another around said axis of rotation, loop sets consisting of string loops wrapped around the bushings in pairs, and supporting rings slipped axially on the bushings to keep the loop sets together axially, wherein the supporting rings each comprise an annular disc having teeth which project radially inwardly and anchor firmly on the corresponding bushing.

2. The flexible disc as claimed in claim 1, wherein said annular disc is formed with guide sections between the teeth, said guide sections defining an inner diameter which is as great as the outer diameter of the corresponding bushing.

3. The flexible disc as claimed in claim 2, wherein two supporting lobes extend from the radially outer edge of each annular disc approximately parallel to the corresponding bushing, the supporting lobes each facing an adjacent bushing.

4. The flexible disc as claimed in claim 2, wherein the annular disc is formed at each side of each tooth with a recess, the width of which is approximately the same as the width of the tooth.

5. The flexible disc as claimed in claim 1, wherein the annular disc is formed at each side of each tooth with a recess, the width of which is approximately the same as the width of the tooth.

6. The flexible disc as claimed in claim 5, wherein two supporting lobes extend from the radially outer edge of each annular disc approximately parallel to the corresponding bushing, the supporting lobes each facing an adjacent bushing.

7. The flexible disc as claimed in claim 1, including two supporting lobes extending from the radially outer edge of each annular disc approximately parallel to the corresponding bushing, each of said supporting lobes facing an adjacent bushing and extending across one loop set and into an adjacent loop set in such a way that the loop sets are prevented from contacting supporting rings on adjacent bushings.

\* \* \* \* \*

UNITED STATES PATENT AND TRADEMARK OFFICE
CERTIFICATE OF CORRECTION

PATENT NO. : 5,562,545
DATED : October 8, 1996
INVENTOR(S) : Werner Wähling and Georg Maierbacher It is certified that error appears in the above-indentified patent and that said Letters Patent is hereby corrected as shown below:

Title page, item '[54]', in the title, after "DISC" delete ",".

Column 1 Line 1, in the title, after "DISC" delete ",".

Column 3 Line 1 "d" should read --D--.

Signed and Sealed this

Seventh Day of January, 1997

Attest:

BRUCE LEHMAN

*Attesting Officer*     *Commissioner of Patents and Trademarks*